Patented June 24, 1930

1,766,950

UNITED STATES PATENT OFFICE

MORDECAI MENDOZA AND KENNETH HERBERT SAUNDERS, OF BLACKLEY, MANCHESTER, ENGLAND, ASSIGNORS TO BRITISH DYESTUFFS CORPORATION LIMITED, OF MANCHESTER, ENGLAND

AZO DYESTUFFS

No Drawing. Original application filed September 29, 1926, Serial No. 138,567, and in Great Britain November 13, 1925. Divided and this application filed August 31, 1928. Serial No. 303,366.

In the copending application of one of us (Saunders) Ser. No. 53,404, filed August 29, 1925, there is described a new class of azo dye intermediates and dyestuffs made therefrom and adapted for mordant dyeing without substantial change in shade after chroming. These new azo dyestuffs are mixed diaromatic sulphones which are characterized by having the aromatic residue which contains the chelate or mordanting group

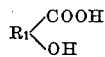

separated or screened from but linked to the residue which contains the color giving or chromophoric group by a bridging divalent radical —SO$_2$— which thus acts as a chromophoric screen.

The intermediates from which the above dyestuffs are made are mono- or diamino sulphones having the general formula

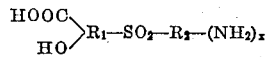

wherein $R_1$ represents a benzene residue and $R_2$ represents a benzene or naphthalene residue, both of which may be further substituted, and $x$ is 1 or 2 and in which the —COOH and —OH groups attached to $R_1$ are ortho to each other.

Monoamino sulphone intermediates are further described and claimed in a copending application Ser. No. 398,805, while the diamino sulphone intermediates are claimed in a copending application Ser. No. 303,371. Both of these applications are divisions of acknowledged application Ser. No. 53,404.

These intermediates may be employed in making dyestuffs of the general type

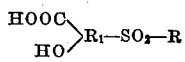

wherein $R_1$ represents a benzene residue and R represents a benzene or naphthalene residue having an azo group attached thereto, the grouping represented by R possessing chromophoric properties and in which the —COOH and —OH groups attached to $R_1$ are ortho to each other.

The diamino sulphones may be represented by the general formula

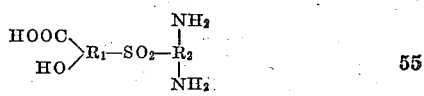

wherein $R_1$ represents a benzene residue and $R_2$ represents a benzene or naphthalene residue, both of which may be further substituted and in which the —COOH and —OH groups attached to $R_1$ are ortho to each other. Various methods may be used to convert the diamino sulphones into dyestuffs. In our copending application, Ser. No. 138,567, of which the present application is a division, methods are described of making both monoazo and polyazo dyestuffs, the former being claimed. The present application is directed to polyazo dyestuffs made from diamino sulphones of the above general formula, which are disclosed in said acknowledged application, Ser. No. 53,404, and of which the following are examples.

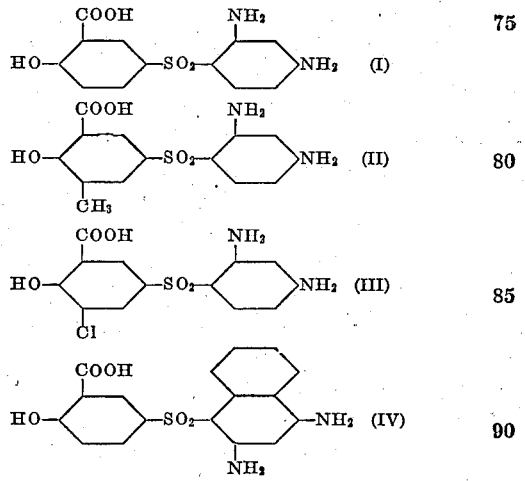

Disazo dyes made from these diamino sulphones may be represented by the general formula

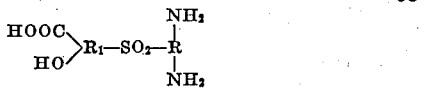

wherein $R_1$ represents a benzene residue and R represents a benzene or naphthalene residue having attached thereto by means of an azo group an azo dye component containing a second azo group, the grouping represented by R having chromophoric properties and in which the —COOH and —OH groups attached to the $R_1$ are ortho to each other.

Disazo dyes may be made from the above diaryl sulphones by coupling with tetrazotized diamino compounds. These dyes may be represented by the general formula

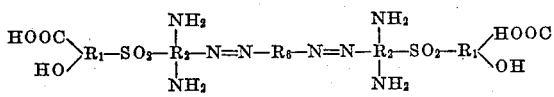

wherein $R_1$ represents a benzene residue and $R_2$ represents a benzene or naphthalene residue, both of which may be further substituted, $R_6$ represents a coupled residue of an azo dye component, and in which the —COOH and —OH groups attached to the $R_1$ are ortho to each other.

One advantageous class of dyes which falls within the scope of the above formula can be represented by the probable formula:

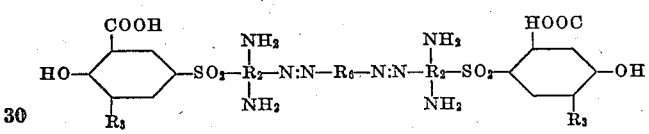

wherein $R_2$ represents an aromatic residue which may be further substituted, $R_3$ represents hydrogen, chlorin or a methyl group and $R_6$ represents a coupled residue of an azo dye component. Examples are given subsequently in which $R_6$ represents the residue of an azo dye component selected from a group consisting of one of the following structures:

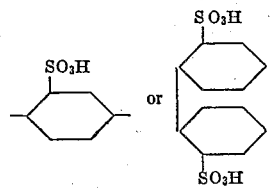

Monoazo dyes formed by coupling one of the sulphones with an azo dye coupling component may be given further treatment to convert them into disazo dyes. For instance the diazotized monoamino compound, with which the sulphone is coupled, may contain a nitro group which may be reduced after the first coupling, diazotized and recoupled with a suitable azo dye coupling component to produce a disazo dye. Such disazo dyes may be represented by the general formula:

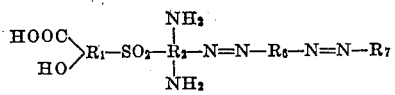

wherein $R_1$ represents a benzene residue and $R_2$ represents a benzene or naphthalene residue, both of which may be further substituted, and $R_6$ and $R_7$ represent residues of azo dye components.

All of the above dyes possess a characteristic structure which permits their use in mordant dyeing without substantial change in shade after chroming. We have herein disclosed the broad scope of our invention and the following examples are given as specific illustrations thereof. These examples in no way limit the scope of the invention. The parts are given by weight.

*Example I.*—21.8 parts of p-nitraniline-o-sulphonic acid are dissolved in 500 parts of water with 5.6 parts of soda ash. The solution after cooling is run slowly into 25.5 parts of a solution of hydrochloric acid (36 per cent) diluted with 250 parts of water. Diazotization is carried out at 0–5° C. by 6.9 parts of sodium nitrite dissolved in 50 parts of water. When diazotization is complete the diazo compound is run down with stirring into a solution of 30.8 parts of diamino-sulphone I, dissolved in 550 parts of water with 56 parts of sodium bicarbonate at 5–10° C.

After about one hour there is added a solution of 50 parts of crystallized sodium sulphide in 50 parts of water. Reduction proceeds with rise of temperature to 15–20° C. and this is maintained for a further four hours. The solution is then rendered neutral with hydrochloric acid followed by a further addition of 25.5 parts of a 36 per cent solution of hydrochloric acid. The second diazotization is carried out at 0–5° C. with 6.9 parts of sodium nitrite dissolved in 50 parts of water. The new diazo compound is then run into a solution of 30.8 parts of the diamino-sulphone I and 35 parts of soda ash in 500 parts of water at 5–10° C.

The dyestuff is salted out after some hours stirring. It has the probable formula

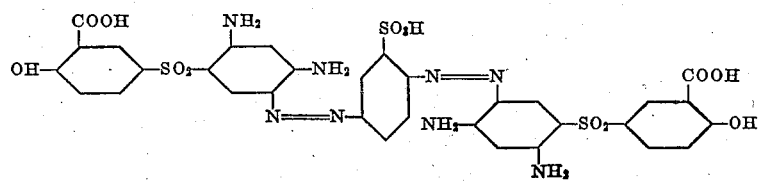

and forms when dry a dark reddish-brown powder, soluble in water with a red-brown colour which is discharged by cold alkaline hydrosulphite, soluble in concentrated sulphuric acid to a violet colored solution, having a brown precipitate on dilution, the dye being reducible by alkaline hydrosulphite with formation of p-phenylenediaminosulphonic acid and 2:4:5-triamino-4'-hydroxy-3'-sulphodiphenyl sulphone. Wool is dyed dark orange from an acid bath, becoming browner on chroming and at the same time fast to milling and so forth. Printed on cotton cloth with a chrome mordant there is obtained a reddish-brown shade fast to warm soap.

*Example II.*—34.4 parts of benzidine-m-disulphonic acid are dissolved in 500 parts of water with 11 parts of soda ash and the cool solution run down with stirring into 51 parts of a 36 per cent solution of hydrochloric acid. Diazotization is carried out at 5° C. with 13.8 parts of sodium nitrite in 100 parts of water. The tetrazo compound is then run down slowly with stirring into a solution of 61.6 parts of the diamino-sulphone I, in 1000 parts of water and 70 parts of soda ash at 5-10° C. The dyestuff is salted out when combination is complete as shown by the usual tests. It has the probable formula

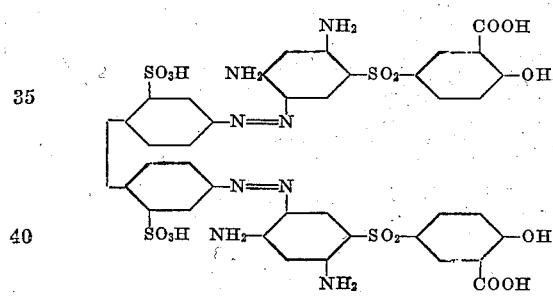

When dry the new dyestuff forms a yellow powder. Wool is dyed deep golden yellow from an acid bath, becoming dull gold on chroming. With a chrome mordant cotton is printed in bright yellow-orange shades fast to warm soap.

What we claim and desire to secure by Letters Patent is:—

1. Disazo dyes carrying a chelate group and adapted for mordant dyeing with the chelate group separated from and connected to the chromophore group by a sulphone bridge, said azo dyes being mixed sulphones having the probable formula

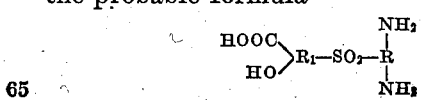

wherein $R_1$ represents a benzene residue and R represents a benzene or naphthalene residue both of which may be further substituted and having attached thereto by means of an azo group an azo dye component containing a second azo group, the group represented by R possessing chromophoric properties and in which the —COOH and —OH groups attached to the $R_1$ are ortho to each other, the said dyes producing shades which are substantially unchanged when chromed.

2. Disazo dyes carrying a chelate group and adapted for mordant dyeing with the chelate group separated from and connected to the chromophore group by a sulphone bridge, said disazo dyes being mixed sulphones having the probable formula

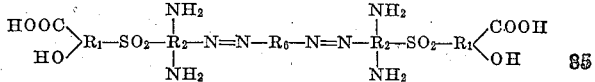

wherein $R_1$ represents a benzene residue and $R_2$ represents a benzene or naphthalene residue, both of which may be further substituted, $R_6$ represents a coupled azo dye component and in which the —COOH and —OH groups attached to the $R_1$ are ortho to each other, the said dyes producing shades which are substantially unchanged when chromed.

3. Disazo dyes carrying a chelate group and adapted for mordant dyeing with the chelate group separated from and connected to the chromophore group by a sulphone bridge, said disazo dyes being mixed sulphones having the probable formula

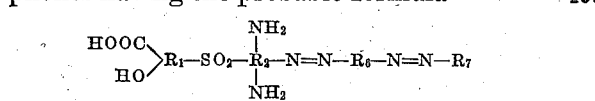

wherein $R_1$ represents a benzene residue and $R_2$ represents a benzene or naphthalene residue, both of which may be further substituted and in which the —COOH— and —OH groups attached to the $R_1$ are ortho to each other and $R_6$ and $R_7$ represents residues of azo dye components, the said dyes producing shades which are substantially unchanged when chromed.

4. Disazo dyes carrying a chelate group and adapted for mordant dyeing with the chelate group separated from and connected to the chromophore group by a sulphone bridge, said disazo dyes being mixed sulphones having the probable formula

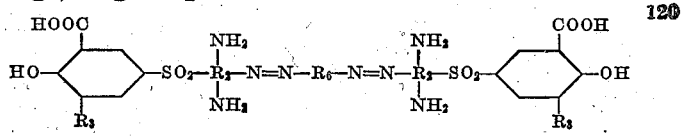

wherein $R_2$ represents an aromatic residue which may be further substituted, $R_3$ represents hydrogen, chlorine or a methyl group and $R_6$ represents a coupled residue of an azo dye component; the said dyes producing shades which are substantially unchanged when chromed.

5. A disazo dye carrying a chelate group and adapted for mordant dyeing with the chelate group separated from and connected to the chromophore group by a sulphone bridge, the said disazo dye being a mixed sulphone having the probable formula

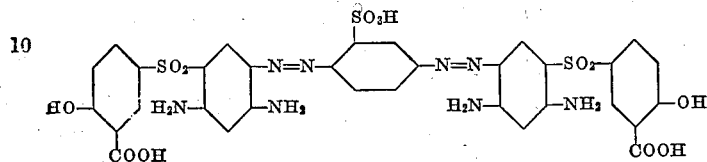

the said dye being a dark reddish-brown powder, soluble in water and soluble in concentrated sulphuric acid and dyeing cotton cloth with a chrome mordant in reddish-brown shades which are fast to soaping and milling.

6. Disazo dyes carrying a chelate group and adapted for mordant dyeing with the chelate group separated from and connected to the chromophore group by a sulphone bridge, said disazo dyes being mixed sulphones having the probable formula

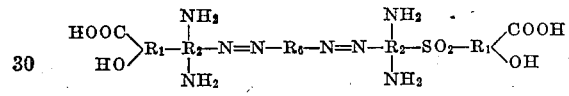

wherein $R_1$ represents a benzene residue and $R_2$ represents a benzene or naphthalene residue, both of which may be further substituted and in which the —OH and —COOH groups are ortho to each other, and $R_6$ represents the residue of an azo dye component selected from a group consisting of one of the following structures:

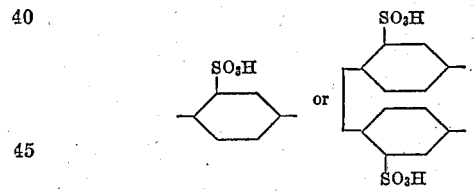

the said dyes producing shades which are substantially unchanged when chromed.

In testimony whereof we affix our signatures.

MORDECAI MENDOZA.
KENNETH HERBERT SAUNDERS.